United States Patent [19]

Richter et al.

[11] 4,438,061

[45] Mar. 20, 1984

[54] TUBE INSERTING MACHINE

[75] Inventors: Simon J. Richter, Marietta, Ga.; Ardashus A. Aykanian, Rancho Palos Verdes, Calif.

[73] Assignee: The Coca-Cola Company, Atlanta, Ga.

[21] Appl. No.: 444,358

[22] Filed: Nov. 23, 1982

[51] Int. Cl.³ .............................................. B29C 6/02
[52] U.S. Cl. ................................. 264/249; 425/110; 425/123; 425/126 R
[58] Field of Search ............. 264/249; 425/110, 116, 425/118, 126 R, 126 S; 53/532

[56] References Cited

U.S. PATENT DOCUMENTS

| | | | |
|---|---|---|---|
| 2,953,997 | 9/1960 | Glass | 425/126 S |
| 3,135,993 | 6/1964 | Ryan | 425/125 X |
| 3,380,118 | 4/1968 | Gualtier | 425/116 X |
| 3,519,707 | 7/1970 | Krup | 264/249 |
| 3,632,245 | 1/1972 | Getman | 425/126 S X |
| 3,776,673 | 12/1973 | De Groft | 425/125 |
| 4,181,695 | 1/1980 | Rickert | 264/249 X |

Primary Examiner—J. Howard Flint, Jr.
Attorney, Agent, or Firm—Birch, Stewart, Kolasch & Birch

[57] ABSTRACT

An apparatus for sequentially feeding a plurality of flow rate control tubes into containers which are subsequently used in gravity flow post-mix beverage dispensers, including a vertical feed hopper containing a plurality of flow rate control tubes, a feeder chute positioned below or at the bottom of the hopper for receiving the tubes single file, and a reciprocating pusher member which enters the lowermost tube and carries it horizontally from the dispensing station at the bottom of the chute into an aperture in a pliable plastic container which is transported along a conveyor transversely to the direction of the movement of the pusher member.

35 Claims, 5 Drawing Figures

TUBE INSERTING MACHINE

BACKGROUND OF THE INVENTION

The present invention relates to a tubular article handling machine and, more specifically, to a machine for sequentially feeding a plurality of flow rate control tubes into syrup packages for use in gravity flow post-mix beverage dispensers.

Disposable packages for dispensing liquids with a controlled rate of flow have been developed for gravity flow post-mix beverage dispensers. An example of such a package is disclosed in U.S. Pat. No. 4,216,885 to Sedam, which is assigned to the same assignee as the present invention. This disposable package includes a thin-wall plastic container with a closed end and an opposed discharge opening. The flow rate control tube is positioned in the container with one open end extending through the closed end of the container and the opposite open end disposed at a predetermined distance within the container from the position of the discharge opening. The discharge opening of the container is sealed by a removable cap and a rupturable membrane. The container and the flow rate control tube are normally manufactured separately, and must be assembled to form a complete package. Thus, it is desirable to provide a system whereby the flow rate control tube may be automatically inserted into the container so as to eliminate manual handling of the individual components of the disposable package while, at the same time, providing an expedient, efficient and rapid means for assembling the disposable package. It would also be desirable to be able to manufacture the package in a continuous process with the blow-molded plastic containers.

Various systems and feeding devices have been developed which are used to accommodate or transfer cylindrical members or elements to various forms of receptacles other than the type described hereinbefore. One such system is disclosed in U.S. Pat. No. 3,740,821 to Von Bredow, which discloses and describes a machine for sequentially loading a push-up ice cream container with sticks. However, the apparatus in Von Bredow is specifically applicable to the method for assembling containers of a different variety than syrup packages and does not lend itself to the needed assembly line type of environment herein required. Other transfer mechanisms and feeding devices such as disclosed in U.S. Pat. No. 3,972,407 to Sushigian, U.S. Pat. No. 3,200,934 to Payn, et al. and U.S. Pat. No. 2,971,677 to Ardell have been developed for automatically transferring cylindrical devices between handling stations. However, each of the systems devised, although suitable for use in the environment in which they are disclosed, are not designed to satisfy the requirements of fabricating or inserting a flow rate control tube described above in connection with the Sedam Patent, into a syrup package.

For example, the aforementioned prior art devices include reciprocating pusher members which engage or impact the ends of tubular articles and launch them into associated guide devices which direct them to a container or work station. These guide devices are bulky and require precise alignment with associated components. Furthermore, some type of stop means is required at the work station for the tube to achieve proper positioning in a container or the like.

SUMMARY OF THE INVENTION

Therefore, it is an object of the present invention to provide a flow rate control tube inserting system for syrup packages for use in gravity flow post-mix beverage dispensers.

It is a further object of the present invention to provide a machine for sequentially feeding a plurality of flow rate control tubes into containers for forming syrup packages.

A further object of the present invention is to provide an automatic means for fabricating a disposable package for dispensing liquids at a controlled rate of flow in a gravity flow post-mix beverage dispenser.

It is another object of the present invention to provide accurate means for picking up tubes and carrying them into proper position within a container by a pusher rod, rather than launching them into a container via intermediate guide devices.

It is still a further object of the present invention to assemble syrup packages including blow-molded plastic containers and flow rate control tubes in line with blow-molding apparatus which continuously supplies warm, softened plastic containers to the apparatus of the present invention.

The foregoing objects and others are accomplished in accordance with the present invention, generally speaking, by providing an apparatus for sequentially feeding a plurality of flow rate control tubes into containers which are subsequently used in gravity flow post-mix beverage dispensers. A vertical feed hopper is provided which contains a plurality of flow rate control tubes, the hopper being funnel-shaped to guide the tubes into a long, narrow trough or feeder chute positioned below or at the bottom of the hopper for receiving the tubes single file. To ensure a constant and smooth flow of the supply of tubes to the long, narrow trough, the hopper is equipped with a motor-driven reciprocating paddle disposed therein to assist the flow of tubes into said trough. A rotating brush is further provided juxtapositioned to the narrow trough to drive and direct the flow of tubes in the trough vertically downward to the dispensing station. A reciprocating pusher member enters the lowermost tubes and carries them, one at a time, horizontally from the dispensing station at the bottom of the chute into an aperture in a pliable plastic container which is transported along a conveyor transversely to the direction of the movement of the pusher member. The aperture in the container is slightly smaller than the outer diameter of the tube, but pliable because of the softened state, permitting insertion into the container. The tube is initially restrained by a rubber wiper in a guide aperture and will slide onto the pusher member before it moves longitudinally to ensure accurate insertion into the container aperture and precise positioning within the container. Automatic control systems are provided for synchronizing the operation of the machine. The configuration of the present invention provides for automatic insertion of the respective tubes into succeeding syrup containers, thereby providing a method which is completely automatic for assemblying a syrup package.

BRIEF DESCRIPTION OF THE DRAWINGS

The invention is further illustrated by way of the accompanying drawings which are intended to demonstrate, but not limit the particulars of the present invention.

DETAILED DESCRIPTION OF THE DRAWINGS

Figure 1:
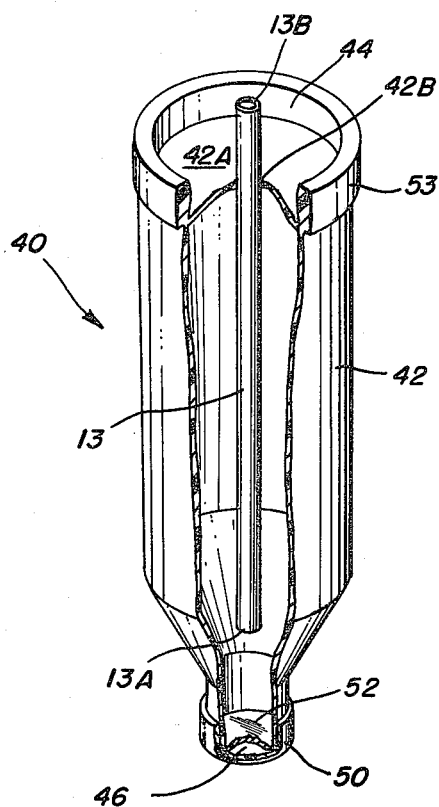
FIG. 1 is an exemplary illustration of a syrup package including a flow rate control tube which may be assembled by the tube insertion apparatus of the present invention.

Referring to FIG. 1, there is illustrated a disposable syrup package 40 to be assembled by the apparatus of the present invention, generally indicated 30.

The disposable package 40 includes a plastic bottle or container 42 having thin sidewalls, a closed end 44 and an open end 46 defining a discharge opening of the disposable package. The open end 46 is provided with a closure member 50. A rupturable membrane, such as a metal foil 52, is secured across the discharge opening at the container end 46. A flow rate control tube 13, to be automatically inserted by the machine of FIG. 3, to be described hereinafter, is permanently secured at a predetermined position within container 42 and has an open end 13A positioned at a predetermined distance above the discharge opening defined by open end 46 of the container. Tube 13 has an opposite open end 13B which extends through an aperture in the end portion 44 of the container 42. End portion 13B of tube 13 is disposed within the confines of recess 42A defined by annular skirt member 53 of plastic or other suitable material which is secured to the end of container 42, or the skirt may be formed as part of the container 42.

Figure 3:
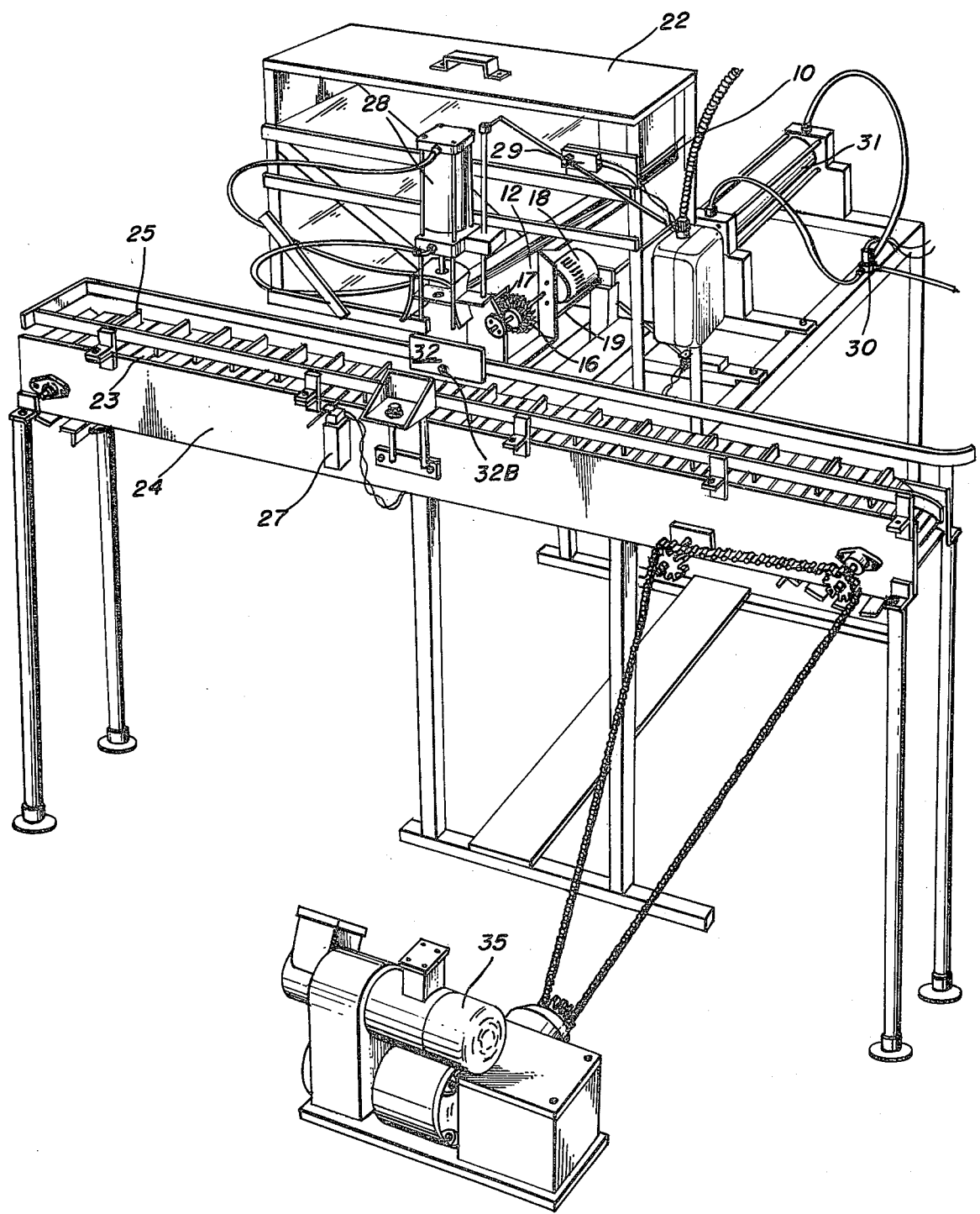
FIG. 3 is a front perspective view of the tube insertion apparatus of the present invention in combination with a conveyor for transporting containers in which flow rate control tubes are to be inserted.

Tube 13 of container 42 in accordance with the present invention is automatically inserted therein by the apparatus of FIG. 3 as the containers are sequentially moved by a conveyor.

Plastic containers 42 may be fabricated in any suitable manner, but are preferably blow molded from polyethylene, polypropylene or polyethylene teraphthalate with an aperture 42B in the closed end 42. Aperture 42B is of slightly smaller diameter than tube 13, as initially blow molded. Thus, tube 13 is force-fit therein, preferably in accordance with the present invention, when container 42 is in a softened plastic state. Thus, aperture 42B is pliable in this state, and will easily flex as a tube 13 is inserted therein, and will also shrink around tube 13 to seal the same therein as container 42 cools and completely solidifies. The advantages of this will become more readily apparent with reference to the operation of the apparatus of FIGS. 2 to 5.

Figure 2:
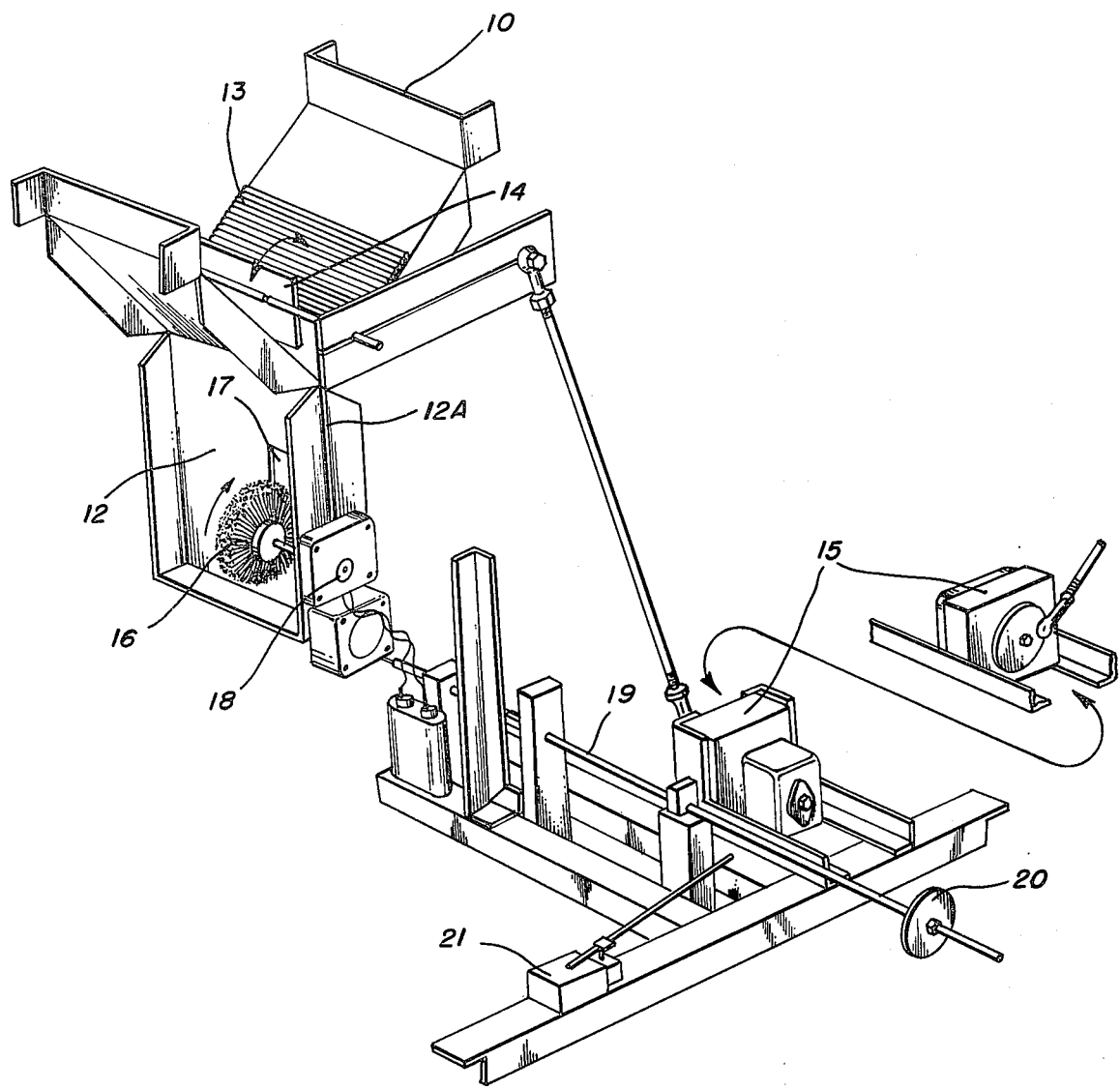
FIG. 2 is a rear perspective view of a portion of the apparatus of FIG. 2.

Referring now to FIG. 2, there is seen a hopper 10 having a long, narrow trough 12 at the bottom. A supply of tubes 13 is provided in the hopper 10 which are channeled into the trough 12, so as to provide a single file verticle arrangement of the tubes therein. The hopper is equipped with a reciprocating paddle 14 driven by a motor 5. The reciprocating rotary motion of the paddle, just above the opening to the trough 12, ensures a constant and smooth flowing supply of tubes to the narrow trough 12. Positioned adjacent to the narrow trough 12 is a rotating brush 16 which drives and directs the flow of the tubes 13 in the trough 12 through a window 17 in the side of the trough. The brush 16 is driven by a motor 18. A push rod 19 is provided which pushes the lowermost tube in slot 12A of trough 12 horizontally from the vertical stack into an associated container in response to appropriate drive signals, the operation of which is more fully discussed below. The tube 13 slides onto the push rod 19 to ensure proper insertion into the container opening before moving longitudinally. That is, the tube is partially restrained from longitudinal movement by suitable means, to be discussed in connection with FIGS. 4 and 5, until the rod 19 moves into the tube to support the same. The push rod 19 is provided with a disc 20 at its rear portion which activates a microswitch 21 at the completion of the insertion of the tube 13 into the container (not shown). The disc 20 activates the microswitch 21, which causes the push rod 19 to reverse, thus allowing for the next tube to drop to the lowermost portion of the trough 12 in front of the push rod 19, thus completing the cycle.

Referring now to FIG. 3, there is illustrated the tube inserting mechanism of FIG. 2, mounted within a support frame and in combination with a conveyor mechanism for transporting the containers into which the tubes are to be inserted. In FIG. 3, the tubes 13 are placed in the hopper 10 which is provided with a cover 22, with the hopper terminating as a long, narrow trough 12 at the bottom-most part thereof, as described hereinbefore. The hopper is equipped with a reciprocating motor-driven paddle 14 (FIG. 2) for maintaining a constant and smooth supply of tubes to the trough 12. The narrow trough 12 is operatively associated with a rotating brush 16 for assisting the downward movement of tubes 13 in the trough by engaging the tubes through the window or opening 17. The brush is driven by motor 18. The conveyor 24 is located in front of the lowermost portion of the trough or chute 12, and conveys the containers 42, into which the tubes 13 are to be inserted. Pusher plates 25, mounted on conveyor belt 23, driven by motor 35, move the respective containers to the inserting station 26. When the container reaches the latter position, a limit switch 27 is actuated, which causes the conveyor to stop and an air piston-driven retaining clamp 28 to come down on the container. As the retainer clamp 28 moves down, it actuates a limit switch 29 mechanically coupled thereto, which activates an air valve 30, which controls air cylinder 31. The air cylinder operates the push rod 19, which picks up and carries a tube from the bottom of the narrow trough 12 and inserts it into the bottom aperture 42A of the container which is being held in position by the clamp 28. A plate 32, fitted with a rubber wiper 32A in a hole 32B, is mounted between the narrow trough 12 and the container. The purpose of the wiper 32A (illustrated in FIGS. 4 and 5, described hereinafter) is to ensure that the tube is not pushed out ahead of the push rod, but must slide onto the push rod to ensure proper insertion into the container opening. When the insertion is completed, the disc 20, mounted on the push rod 19, activates the microswitch 21, as discussed above, which reverses the push rod 19 while, at the same time, the clamp 18 rises to release the container. As the clamp 18 rises, it activates microswitch 29 which restarts the conveyor, bringing the next successive container into position for the next phase of the operation.

Figure 4:
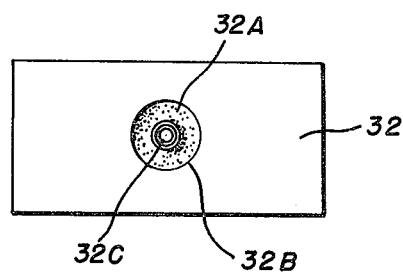
FIGS. 4 and 5 are enlarged views of portions of the FIG. 2 apparatus illustrating the interaction of a push rod and a tube-restraining wiper just prior to the insertion of a tube into a container.
Figure 5:
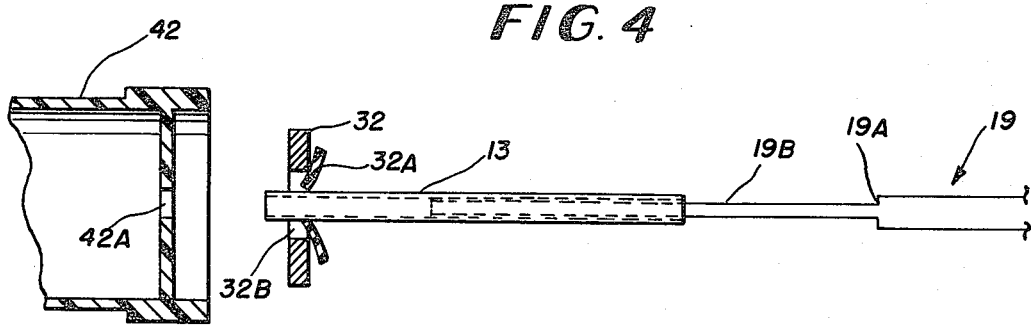

The precise manner in which a tube 13 is inserted into an aperture 42A of a container 42 by the apparatus of FIGS. 2 and 3 is better illustrated in conjunction with FIGS. 4 and 5. FIG. 4 is an enlarged view of guide plate 32 of FIG. 3, illustrating an enlarged aperture 32B therethrough and a flexible rubber wiper 32A disposed within aperture 32B. Wiper 32A, seen through opening 32B, is annular in shape with a central aperture 32C of a slightly smaller diameter than the outside diameter of tubes 13. Wiper 32A may be secured within aperture 32B by any suitable means.

As illustrated in FIG. 5, push rod 19 may have a reduced diameter pick-up portion 19B of slightly less external diameter than the inside diameter of tube 13. This permits pick-up portion 19B to be inserted within tube 13, to carry the same to the desired position within container 42 until the push rod 19 is withdrawn. Push rod 19 has a shoulder 19A, which will engage the rear end of tube 13 in FIG. 5 as push rod 19 moves from right to left in that Figure. When this occurs, tube 13 will be pushed entirely through wiper 32A into aperture 42A, and accurately located in container 42 as the forward stroke of push rod 19 is completed. Push rod 19 may then be withdrawn, leaving tube 13 within container 42 and aperture 42A in the desired position by virtue of the force fit in aperture 42A and the cooling of the warm container 42, which causes some subsequent shrinking and sealing of the container about the tube 13.

It should be understood that it is not imperative that the container be heated to its softening point if the bottom is sufficiently flexible to enable the aforementioned force fit. However, an additional sealing step would then be required.

As best illustrated in FIG. 5, the wiper 32A, having a central aperture 32C of a slightly smaller diameter than the outside diameter of tube 13, deforms as it initially engages tube 13, creating a frictional drag on the surface thereof. Accordingly, tube 13 is at least partially restrained by wiper 32A until pick-up portion 19B of push rod 19 is fully inserted and shoulder 19A engages the rear end of tube 13. It can be seen that with the combination of the rod structure 19 and the flexible wiper 32A in FIG. 5, that tube 13 is accurately carried into container 42 through aperture 42A, and is precisely located therein as a function of the forward stroke distance of reciprocating push rod 19. Since this forward stroke distance is always essentially the same, tubes 13 may be accurately disposed in the same desired positions within container 42. This is particularly important to the proper operation of the flow rate control tube in a syrup package in that the distance of the open end of tube 13B within the container with respect to the discharge opening thereof, may be critical to the proper operation of the package.

It should be understood that the wiper 32A could have other configurations than the annular shape of FIGS. 4 and 5, if desired. However, this annular configuration provides a symmetric guide means, and, at the same time, applies an appropriate amount of drag on tube 13 to restrain its movement until pick-up portion 19B of rod 19 can be fully inserted therein. It should be further understood that shoulder 19A of rod 19 could be a disk or flange on a rod having the same external diameter along its entire longitudinal length as the diameter of pickup portion 19B, if desired.

It should be understood that the apparatus described hereinbefore may be further modified as would occur to one of ordinary skill in the art without departing from the spirit and scope of the present invention.

What is claimed is:

1. An apparatus for automatically inserting a tubular article within each of a sequence of containers at the same predetermined positions therein comprising:
    means for sequentially conveying said containers through a work station;
    means for temporarily arresting the conveyance of said containers when any one of said containers reaches said work station;
    means for supporting a supply of tubular articles at a transfer station adjacent said work station; and
    reciprocating rod means for engaging a tubular article at said transfer station and carrying said tubular article therewith into said predetermined position within a container at said work station as said rod means moves in a forward direction, and leaving said tubular article at said predetermined position as said rod means moves in a reverse direction.

2. The apparatus of claim 1, wherein said rod means reciprocates along a longitudinal axis thereof and is so structured that it telescopically engages said tubular article to carry said tubular article into said predetermined position within a container.

3. The apparatus of claim 2, further comprising:
    restraining means disposed between said rod means and said work station for partially restraining movement of said tubular article until said rod means can telescope with respect thereto.

4. The apparatus of claim 3, wherein said restraining means comprises a flexible wiper for frictionally engaging said tubular article to brake the longitudinal movement thereof toward said work station.

5. The apparatus of claim 4, wherein said wiper comprises a flexible membrane with an aperture therein for accommodating the movement of said tubular article therethrough, said aperture having a slightly smaller diameter than the outside diameter of said tubular article.

6. The apparatus of claim 5, wherein said flexible membrane is disposed within a passage in a guide plate.

7. The apparatus of claim 2, wherein said rod means includes stop means thereon for engaging the trailing end of said tubular article to limit the extent of telescopic movement between said tubular article and said rod means as said tubular article is transferred to said work station.

8. The apparatus of claim 2, wherein said rod means has at least a portion thereof with an outside diameter less than the inside diameter of said tubular article and said rod means telescopes within said tubular article.

9. The apparatus of claim 8, wherein said rod means includes stop means thereon for engaging the trailing end of said tubular article to limit the extent of telescopic movement between said tubular article and said rod means as said tubular article is transferred to said work station.

10. A method for automatically inserting a tubular article within each of a sequence of plastic containers through an aperture in the bottom thereof to the same predetermined positions within each said container, comprising the steps of:
    sequentially conveying said containers through a work station;
    temporarily arresting the conveyance of said containers when any one of said containers reaches said work station;
    supporting a supply of tubular articles at a transfer station adjacent said work station;

engaging a tubular article at said transfer station with a reciprocating rod means and carrying said tubular article therewith through a container aperture into said predetermined position within said container at said work station as said rod means moves in a forward direction; and leaving said tubular article at said predetermined position as said rod means moves in a reverse direction.

11. The method of claim 10, wherein said rod means reciprocates along a longitudinal axis thereof and is so structured that it telescopically engages said tubular article to carry said tubular article into said predetermined position within a container.

12. The method of claim 11, comprising the further step of:
partially restraining the movement of said tubular article until said rod means can telescope with respect thereto.

13. The method of claim 12, wherein said restraining is implemented by a flexible wiper for frictionally engaging said tubular article to brake the longitudinal movement thereof toward said work station.

14. The method of claim 13, wherein said wiper comprises a flexible membrane with an aperture therein for accommodating the movement of said tubular article therethrough, said aperture having a slightly smaller diameter than the outside diameter of said tubular article.

15. The method of claim 14, wherein said flexible membrane is disposed within a passage in a guide plate.

16. The method of claim 11, wherein said rod means includes stop means thereon for engaging the trailing end of said tubular article to limit the extent of telescopic movement between said tubular article and said rod means as said tubular article is transferred to said work station.

17. The method of claim 11, wherein said rod means has at least a portion thereof with an outside diameter less than the inside diameter of said tubular article and said rod means telescopes within said tubular article.

18. The method of claim 17, wherein said rod means includes stop means thereon for engaging the trailing end of said tubular article to limit the extent of telescopic movement between said tubular article and said rod means as said tubular article is transferred to said work station.

19. The method of claim 10, comprising the further step of:
supplying said plastic containers to said conveyor in a pliable state, said aperture in the bottom of said container being of a slightly smaller diameter than the outside diameter of said tubular article, whereby said tubular article is gripped by said aperture to permit said rod means to be moved in said reverse direction independently of said tubular article.

20. The method of claim 16, comprising the further step of:
supplying said plastic containers to said conveyor in a pliable state, said aperture in the bottom of said container being of a slightly smaller diameter than the outside diameter of said tubular article, whereby said tubular article is gripped by said aperture to permit said rod means to be moved in said reverse direction independently of said tubular article.

21. The method of claim 17, comprising the further step of:
supplying said plastic containers to said conveyor in a pliable state, said aperture in the bottom of said container being of a slightly smaller diameter than the outside diameter of said tubular article, whereby said tubular article is gripped by said aperture to permit said rod means to be moved in said reverse direction independently of said tubular article.

22. The method of claim 18, comprising the further step of:
supplying said plastic containers to said conveyor in a pliable state, said aperture in the bottom of said container being of a slightly smaller diameter than the outside diameter of said tubular article, whereby said tubular article is gripped by said aperture to permit said rod means to be moved in said reverse direction independently of said tubular article.

23. The method of claim 19, including the further step of:
cooling said container to permit said aperture in the bottom of said container to shrink and seal against the outside of said tube.

24. The method of claim 20, including the further step of:
cooling said container to permit said aperture in the bottom of said container to shrink and seal against the outside of said tube.

25. The method of claim 21, including the further step of:
cooling said container to permit said aperture in the bottom of said container to shrink and seal against the outside of said tube.

26. The method of claim 22, including the further step of:
cooling said container to permit said aperture in the bottom of said container to shrink and seal against the outside of said tube.

27. The method of claim 10, wherein the aperture in the bottom of said container is of a slightly smaller diameter than the outside diameter of said tubular article, whereby said tubular article is gripped by said aperture to permit said rod means to be moved in said reverse direction.

28. The method of claim 16, wherein the aperture in the bottom of said container is of a slightly smaller diameter than the outside diameter of said tubular article, whereby said tubular article is gripped by said aperture to permit said rod means to be moved in said reverse direction.

29. The method of claim 17, wherein the aperture in the bottom of said container is of a slightly smaller diameter than the outside diameter of said tubular article, whereby said tubular article is gripped by said aperture to permit said rod means to be moved in said reverse direction.

30. The method of claim 18, wherein the aperture in the bottom of said container is of a slightly smaller diameter than the outside diameter of said tubular article, whereby said tubular article is gripped by said aperture to permit said rod means to be moved in said reverse direction.

31. An apparatus for automatically inserting a flow-rate control tube into each of a sequence of containers through the bottom surfaces thereof, said apparatus comprising:

means for sequentially conveying said containers through a work station;

means for temporarily arresting the conveyance of said containers when one of said containers reaches said work station;

means responsive to the arrest of the conveyance of said containers for positioning and retaining at least one of said containers at said work station such that the bottom of said container is positioned to receive said tube;

a tube aligning system juxtapositioned to said work station, said system including an upper V-shaped hopper containing a multitude of tubes terminating as a narrow, elongated trough at the bottom thereof, for receiving said tubes, said tubes being fed by gravity from said hopper into said trough so as to form a single stack of tubes therein, the lowermost of which being generally axially aligned with the bottom of said container at said work station such that, upon axial movement of the lowermost tube, said tube is inserted into said container at said work station; and means for moving said lowermost tube axially out of said trough into a predetermined position within said container through the bottom thereof at said work station.

32. The apparatus of claim 31, wherein said means for moving said lowermost tube axially out of said trough comprises a push rod which picks up said lowermost tube from the bottom of said trough and carries said tube therewith into said predetermined position within said container through the bottom thereof.

33. The apparatus of claim 32, further including restraining means mounted between said trough and said container which prevents said tube from being pushed out ahead of said push rod and enables the push rod to enter within said tube so as to enable said push rod to carry said tube to said predetermined position within said container through the bottom thereof.

34. The apparatus of claim 31, further including a reciprocating paddle disposed in said hopper so as to facilitate and maintain a constant and smooth supply of tubes to said trough.

35. The apparatus of claim 34, further including rotary brush means fixed to said trough and in operative contact with said tubes for assisting the movement of said tubes through said trough.

* * * * *